US010824817B1

(12) United States Patent
Cougias et al.

(10) Patent No.: US 10,824,817 B1
(45) Date of Patent: Nov. 3, 2020

(54) AUTOMATIC COMPLIANCE TOOLS FOR SUBSTITUTING AUTHORITY DOCUMENT SYNONYMS

(71) Applicant: Unified Compliance Framework (Network Frontiers), Lafayette, CA (US)

(72) Inventors: Dorian J. Cougias, Oakland, CA (US); Vicki McEwen, Oakland, CA (US); Steven Piliero, Oakland, CA (US); Lucian Hontau, Oakland, CA (US); Zike Huang, Oakland, CA (US); Sean Kohler, Oakland, CA (US)

(73) Assignee: Unified Compliance Framework (Network Frontiers), Las Vegas, NV (US)

( * ) Notice: Subject to any disclaimer, the term of this patent is extended or adjusted under 35 U.S.C. 154(b) by 0 days.

(21) Appl. No.: 16/459,412

(22) Filed: Jul. 1, 2019

(51) Int. Cl.
| | |
|---|---|
| *G06F 40/247* | (2020.01) |
| *G06F 40/279* | (2020.01) |
| *G06Q 50/18* | (2012.01) |
| *G06F 40/30* | (2020.01) |
| *G06Q 30/00* | (2012.01) |
| *G06F 40/253* | (2020.01) |

(52) U.S. Cl.
CPC ............ *G06F 40/30* (2020.01); *G06F 40/247* (2020.01); *G06F 40/253* (2020.01); *G06Q 30/018* (2013.01)

(58) Field of Classification Search
CPC .. G06F 17/273; G06F 17/2735; G06F 17/274; G06F 17/2755; G06F 17/2785; G06F 17/2795; G06F 40/237; G06F 40/242; G06F 40/247; G06F 40/279; G06F 40/284; G06F 40/289; G06F 40/30; G10L 15/18; G10L 15/1815; G10L 15/19; G06Q 50/18

USPC .................... 704/1, 9, 10; 705/342; 715/271
See application file for complete search history.

(56) References Cited

U.S. PATENT DOCUMENTS

| | | | |
|---|---|---|---|
| 4,847,766 A | 7/1989 | McRae et al. | |
| 5,715,468 A | 2/1998 | Budzinski | |
| 5,745,776 A | 4/1998 | Sheppard, II | |
| 6,289,342 B1 | 9/2001 | Lawrence et al. | |
| 6,453,315 B1 | 9/2002 | Weissman et al. | |
| 6,675,169 B1 | 1/2004 | Bennett et al. | |
| 6,738,780 B2 | 5/2004 | Lawrence et al. | |
| 6,823,325 B1 | 11/2004 | Davies et al. | |

(Continued)

FOREIGN PATENT DOCUMENTS

WO 2008121382 10/2008

OTHER PUBLICATIONS

Wikipedia, "Frequency (statistics)", 4 pages, downloaded Mar. 10, 2020. (Year: 2020).*

(Continued)

*Primary Examiner* — Martin Lerner
(74) *Attorney, Agent, or Firm* — Perkins Coie LLP

(57) ABSTRACT

A facility for representing a mandate occurring in an authority document with a control is described. For each of one or more controls in a set of existing controls, the facility determines a similarity score measuring the similarity of the mandate and the control; where the similarity score exceeds a similarity threshold, the facility links the mandate to the control. Where the mandate is not linked to any control in the set of controls, the facility adds a control to the set of controls that is based on the mandate, and links the mandate to the added control.

20 Claims, 23 Drawing Sheets

(56) References Cited

U.S. PATENT DOCUMENTS

| | | | |
|---|---|---|---|
| 6,966,030 | B2 | 11/2005 | Ashford et al. |
| 7,333,927 | B2 | 2/2008 | Lee et al. |
| 7,493,253 | B1 | 2/2009 | Ceusters et al. |
| 7,869,989 | B1 | 1/2011 | Harvey et al. |
| 8,019,590 | B1 | 9/2011 | Kinder |
| 8,019,769 | B2 | 9/2011 | Rolle |
| 8,108,207 | B1 | 1/2012 | Harvey et al. |
| 8,190,423 | B2 | 5/2012 | Rehberg et al. |
| 8,219,566 | B2 | 7/2012 | Rolle |
| 8,661,059 | B1 | 2/2014 | Cougias |
| 9,009,197 | B2 | 4/2015 | Cougias |
| 9,110,975 | B1 | 8/2015 | Diligenti et al. |
| 9,715,497 | B1 | 7/2017 | Bhadbhade et al. |
| 9,760,586 | B1 | 9/2017 | Cook |
| 9,798,753 | B1 | 10/2017 | Cook |
| 9,798,767 | B1 | 10/2017 | Cook |
| 9,846,694 | B1 | 12/2017 | Cook |
| 9,923,931 | B1 | 3/2018 | Wagster et al. |
| 9,996,608 | B2 | 6/2018 | Cougias |
| 10,198,491 | B1 | 2/2019 | Semturs et al. |
| 10,353,933 | B2 | 6/2019 | Cougias |
| 10,387,575 | B1 | 8/2019 | Shen et al. |
| 2002/0065675 | A1 | 5/2002 | Grainger et al. |
| 2003/0067498 | A1 | 4/2003 | Parisi |
| 2004/0030540 | A1 | 2/2004 | Ovil et al. |
| 2005/0080776 | A1* | 4/2005 | Colledge ............ G06F 17/2795 |
| 2005/0080780 | A1 | 4/2005 | Colledge et al. |
| 2005/0096914 | A1* | 5/2005 | Williamson ............ G10L 15/22 |
| | | | 704/277 |
| 2005/0203924 | A1 | 9/2005 | Rosenberg |
| 2005/0228799 | A1 | 10/2005 | Farlow et al. |
| 2006/0047656 | A1 | 3/2006 | Dehlinger et al. |
| 2006/0149720 | A1 | 7/2006 | Dehlinger |
| 2006/0149800 | A1 | 7/2006 | Egnor et al. |
| 2006/0259475 | A1 | 11/2006 | Dehlinger |
| 2007/0088683 | A1 | 4/2007 | Feroglia et al. |
| 2007/0118515 | A1 | 5/2007 | Dehlinger |
| 2007/0283252 | A1 | 12/2007 | Stuhec |
| 2008/0208563 | A1 | 8/2008 | Sumita |
| 2009/0024385 | A1 | 1/2009 | Hirsch |
| 2009/0112859 | A1 | 4/2009 | Dehlinger |
| 2009/0119141 | A1 | 5/2009 | McCalmont et al. |
| 2009/0187567 | A1 | 7/2009 | Rolle |
| 2009/0265199 | A1 | 10/2009 | Moerdler et al. |
| 2010/0114628 | A1 | 5/2010 | Adler et al. |
| 2011/0208769 | A1 | 8/2011 | Kemp |
| 2011/0270603 | A1 | 11/2011 | Ovil et al. |
| 2012/0036157 | A1 | 2/2012 | Rolle |
| 2012/0072422 | A1 | 3/2012 | Rollins et al. |
| 2012/0116984 | A1* | 5/2012 | Hoang ................. G06Q 30/018 |
| | | | 705/317 |
| 2013/0091486 | A1* | 4/2013 | Gemmell ........... G06Q 10/0639 |
| | | | 717/104 |
| 2013/0297477 | A1 | 11/2013 | Overman et al. |
| 2014/0046892 | A1 | 2/2014 | Gopalakrishnan et al. |
| 2014/0244524 | A1 | 8/2014 | Bresthoff et al. |
| 2015/0066478 | A1* | 3/2015 | Onishi .................... G06F 40/30 |
| | | | 704/9 |
| 2015/0220621 | A1* | 8/2015 | Cougias .............. G06F 17/2288 |
| | | | 707/741 |
| 2016/0306789 | A1* | 10/2016 | Cougias .............. G06F 17/2795 |
| 2016/0350283 | A1 | 12/2016 | Carus et al. |
| 2016/0371618 | A1 | 12/2016 | Leidner et al. |
| 2017/0147635 | A1 | 5/2017 | McAteer et al. |
| 2017/0178028 | A1* | 6/2017 | Cardonha ........... G06F 17/2795 |
| 2017/0220536 | A1* | 8/2017 | Chiba ................. G06F 17/2795 |
| 2017/0300472 | A1 | 10/2017 | Parikh et al. |
| 2018/0101779 | A1 | 4/2018 | Canim et al. |
| 2018/0314754 | A1 | 11/2018 | Cougias |
| 2018/0373691 | A1* | 12/2018 | Alba .................... G06F 17/2795 |
| 2019/0080018 | A1 | 3/2019 | Pilkington et al. |
| 2019/0163778 | A1* | 5/2019 | Brown ................. G06F 40/279 |
| 2019/0188400 | A1* | 6/2019 | Vandervort ......... G06F 21/6209 |
| 2019/0286642 | A1 | 9/2019 | Cougias |
| 2019/0286643 | A1 | 9/2019 | Cougias |
| 2020/0050620 | A1 | 2/2020 | Clark et al. |
| 2020/0176098 | A1* | 6/2020 | Lucas .................... G06F 40/30 |

OTHER PUBLICATIONS

Wikipedia, "Word lists by frequency", 10 pages, downloaded Mar. 10, 2020. (Year: 2020).*

International Search Report and Written Opinion for International App. No. PCT/US2013/068341, dated Feb. 26, 2014, 11 pages.

Proffitt, Tim, "Meeting Compliance Efforts with the Mother of All Control Lists (MOACL)," SANS Institute Information Security Reading Room, 2010, 56 pages.

Cloud Security Alliance, "Security Guidance for Critical Areas of Focus in Cloud Computing V2.1," Dec. 2009, 76 pages.

"AuditScripts—About Us," <www.auditscripts.com/about-us/>, 2011. (2 Pages).

"CSA Cloud Security Alliance—History," <cloudsecurityalliance.org/history/>, 2010, (2 Pages).

"HITRUST Common Security Framework Matures with Enhancements for 2010," Feb. 1, 2010, 4 pages. <hitrustalliance.net/hitrust-common-security-framework-matures-enhancements-2010/>.

"ISF Information Security Forum," <securityforum.org/about/>, first published 2007, (3 Pages).

International Search Report and Written Opinion for counterpart PCT Application No. PCT/US2016/026787, dated Jul. 22, 2016 (15 pages).

* cited by examiner

| control id | text | primary verb | primary noun |
|---|---|---|---|
| 1111 | protect all personally identifiable information | protect | personally identifiable informaton | control table — 300

| mandate id | document id | document section | mandate ordinal | normalized mandate | primary verb | primary noun | control id | verb vector | noun vector | similarity score |
|---|---|---|---|---|---|---|---|---|---|---|
| 111.1.1 | 111 | 2(c)(4) | 1 | safeguard sensitive personal information | safeguard | sensitive personal information | 11.1.1 | safeguard -> protect | sensitive personal information -> personally identifiable information | 87.50% |

*mandate table* — 800
801
811 812 813 814 815 816 817 818 819 820 821

| mandate id | document id | document section | mandate ordinal | normalized mandate | primary verb | primary noun | control id | verb vector | noun vector | similarity score |
|---|---|---|---|---|---|---|---|---|---|---|
| 111111 | 111 | 2(c)(4) | 1 | safeguard sensitive personal information | safeguard | sensitive personal information | 1111 | safeguard -> protect | sensitive personal information -> personally identifiable information | 87.50% |
| 222222 | 222 | 1.A.ii.c | 1 | secure identity information | secure | identity information | 1111 | secure -> protect | identity information -> personally identifiable information | 87.50% | mandate table — 900
901
902
911, 912, 913, 914, 915, 916, 917, 918, 919, 920, 921

| control id | text | primary verb | primary noun |
|---|---|---|---|
| 1111 | protect all personally identifiable information | protect | personally identifiable informaton |
| 2222 | secure premises | secure | premises |

FIG. 11

| mandate id | document id | document section | mandate ordinal | normalized mandate | primary verb | primary noun | control id | verb vector | noun vector | similarity score |
|---|---|---|---|---|---|---|---|---|---|---|
| 111111 | 1111 | 2(c)(4) | 1 | safeguard sensitive personal information | safeguard | sensitive personal information | 1111 | safeguard -> protect | sensitive personal information -> personally identifiable information | 87.50% |
| 222222 | 2222 | 1.A.ii.c | 1 | secure identity information | secure | identity information | 1111 | secure -> protect | identity information -> personally identifiable information | 87.50% |
| 333333 | 2222 | 1.A.ii.c | 2 | secure immediate physical premises | secure | immediate physical premises | 2222 | secure -> secure | immediate physical premises -> premises | 95% |

*FIG. 12*

| preferred term table 1400 | | | |
|---|---|---|---|
| group id | term | frequency | preferred |
| 11111111 | personally identifiable information | 377 | |
| 11111111 | confidential information | 210 | |
| 11111111 | identity information | 39 | |
| 11111111 | non-public information | 28 | |
| 11111111 | personal data | 743 | yes |
| 11111111 | sensitive personal information | 97 | |
| 11111111 | specially restricted data | 11 | |

*FIG. 14*

| control id | text | primary verb | primary noun |
|---|---|---|---|
| 1111 | protect all personal data | protect | personal data |
| 2222 | secure premises | secure | premises | control table — 1500, 1501, 1502
1511, 1512, 1513, 1514

*FIG. 15*

| mandate id | document id | document section | mandate ordinal | normalized mandate | primary verb | primary noun | control id | verb vector | noun vector | similarity score |
|---|---|---|---|---|---|---|---|---|---|---|
| 111111 | 111 | 2(c)(4) | 1 | safeguard sensitive personal information | safeguard | sensitive personal information | 1111 | safeguard -> protect | sensitive personal data -> personal data | 87.50% |
| 222222 | 222 | 1.A.ii.c | 1 | secure identity information | secure | identity information | 1111 | secure -> protect | identity information -> personal data | 87.50% |
| 333 | 222 | 1.A.ii.c | 2 | secure immediate physical premises | secure | immediate physical premises | 2222 | secure -> secure | immediate physical premises -> premises | 95% | mandate table 1600

| control id | evidence document id | evidence description |
|---|---|---|
| 1111 | 99230912 | 01/19/2019 report listing all 7231 users and showing each to have personal data protected |

*FIG. 18*

AUTOMATIC COMPLIANCE TOOLS FOR SUBSTITUTING AUTHORITY DOCUMENT SYNONYMS

CROSS-REFERENCE TO RELATED APPLICATIONS

This application is related to the following applications, each of which is hereby incorporated by reference in its entirety: U.S. Provisional Patent Application No. 61/722,759 filed on Nov. 5, 2012; U.S. patent application Ser. No. 13/723,018 filed on Dec. 20, 2012 (now U.S. Pat. No. 9,009,197); U.S. patent application Ser. No. 13/952,212 filed on Jul. 26, 2013 (now U.S. Pat. No. 8,661,059); International Application No. PCT/US2013/068341 filed on Nov. 4, 2013; U.S. patent application Ser. No. 14/685,466 filed on Apr. 13, 2015 (now U.S. Pat. No. 9,996,608); U.S. patent application Ser. No. 15/794,405 filed on Oct. 26, 2017 (now U.S. Pat. No. 10,353,933); U.S. patent application Ser. No. 16/026,524 filed on Jul. 3, 2018; U.S. patent application Ser. No. 16/432,634 filed on Jun. 5, 2018; U.S. patent application Ser. No. 16/432,737 filed on Jun. 5, 2018; U.S. Provisional Patent Application No. 62/150,237 filed on Apr. 20, 2015; U.S. patent application Ser. No. 14/963,063 filed on Dec. 8, 2015 (now U.S. Pat. No. 9,575,954); International Application No. PCT/US2016/026787 filed on Apr. 8, 2016; U.S. patent application Ser. No. 15/404,916 filed on Jan. 12, 2017 (now U.S. Pat. No. 9,977,775); and U.S. patent application Ser. No. 15/957,764 filed on Apr. 19, 2018. In cases where the present patent application conflicts with an application or other document incorporated herein by reference, the present application controls.

BACKGROUND

Various entities seek to regulate the operations of businesses and other organizations. For example, federal, state, county, and local governments enact statutes, promulgate administrative regulations, and publish regulatory directives and guidance; counterparties to contracts impose contractual obligations; standards bodies adopt standards; technology vendors publish documentation detailing how their products should be used; and organizations establish rules for their own operation.

Documents that seek to regulate the operation of an organization are sometimes called authority documents. They contain mandates, which each direct the organization to take a particular action.

Organizations often seek to comply with authority documents that are relevant to their operations, by (1) understanding their mandates, (2) taking the action needed to satisfy the mandates, and (3) documenting this action and its connection to the mandate. These compliance efforts help an organization's leaders determine whether the organization is behaving responsibly. Compliance efforts also help an organization respond promptly and successfully to auditing or enforcement actions by an external party.

BRIEF DESCRIPTION OF THE DRAWINGS

FIG. 3 is a table diagram showing a control table used by the facility in some embodiments to store a list of controls that it has constructed to represent mandates in authority documents.

FIG. 8 is a table diagram showing sample contents of a mandate table used by the facility in some embodiments to maintain a list of mandates that have been linked to controls while in a first state.

FIG. 9 is table diagram showing sample contents of a mandate table used by the facility in some embodiments to maintain a list of mandates that have been linked to controls while in a second state.

FIG. 11 is a table diagram showing sample contents of the control table used by the facility in some embodiments, updated to reflect the additionally created control.

FIG. 12 is a table diagram showing a further state of the mandate table updated to include a mandate links to the new control added to the list of controls.

FIG. 14 is a table diagram showing sample contents of a preferred term table used by the facility in some embodiments to track preferred terms occurring in groups of synonymous terms.

FIG. 15 is a table diagram showing sample contents of the control table used by the facility in some embodiments, updated to change the primary noun in corresponding text of a control to match a preferred term.

FIG. 16 is a table diagram showing sample contents of the mandate table used by the facility in some embodiments, updated to reflect the above-discussed change to a linked-to control. By comparing mandate table 1600 shown in FIG. 16 to mandate table 1200 shown in FIG. 12, it can be seen that the facility has updated rows 1601 and 1602 to contain "personal information" in the place of "personally identifiable information".

FIG. 18 is a table diagram showing sample contents of an evidence table used by the facility in some embodiments to store evidence of compliance provided in connection with the control.

DETAILED DESCRIPTION

Figure 1:
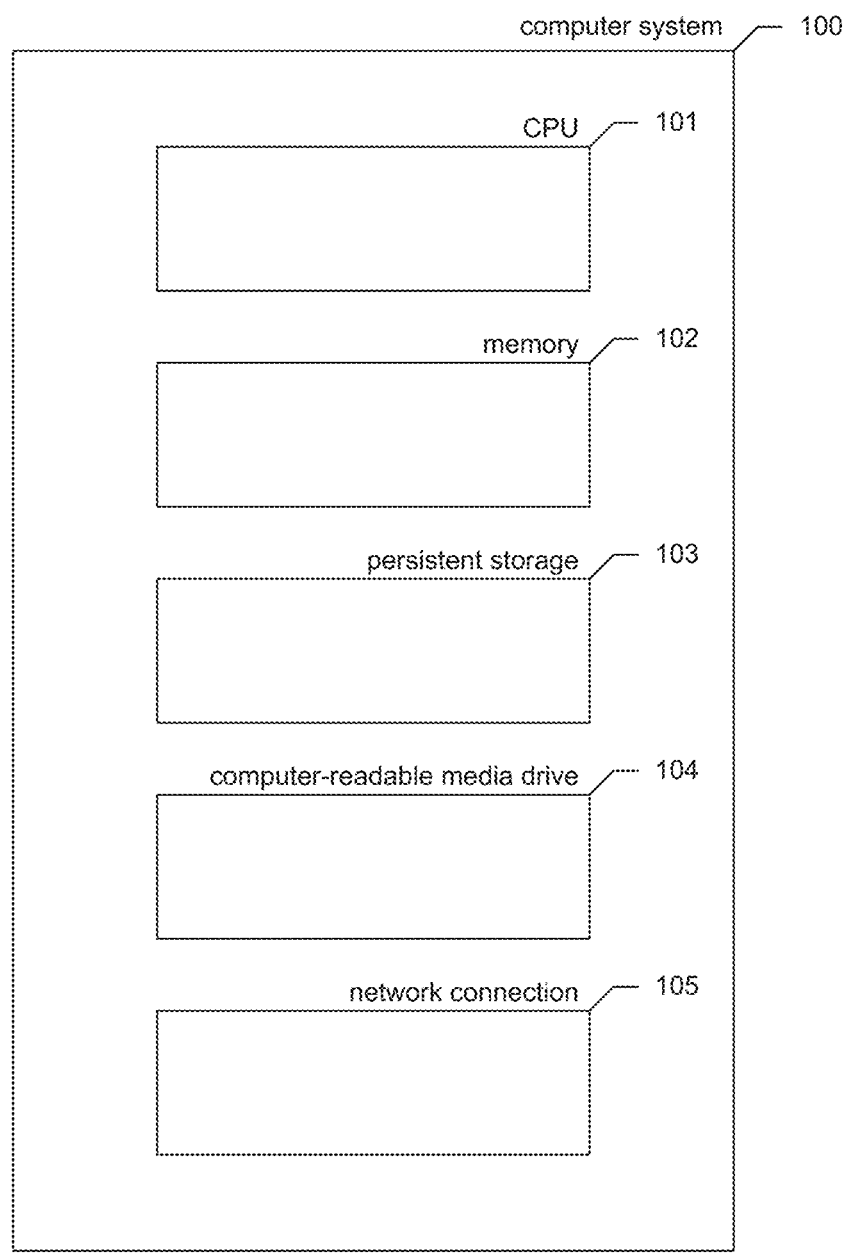
FIG. 1 is a block diagram showing some of the components typically incorporated in at least some of the computer systems and other devices on which the facility operates.

The inventor has recognized that, for many organizations, compliance is difficult and burdensome. This is particularly true for organizations that are subject to numerous and/or complex authority documents, issued by multiple issuers of authority documents.

One source of difficulty recognized by the inventor is that mandates are often written in confusing ways, frustrating efforts to understand and satisfy them.

Another source of difficulty recognized by the inventor is that there can be a significant level of redundancy among the mandates to which an organization is subject. For example, a single authority document may contain three different mandates that require the same action. When this authority document is combined with five additional authority documents that relate to a particular organization's operations, this set of six authority documents may contain eleven mandates requiring the same action. The inventor has recognized that this high level of redundancy makes compliance efforts unnecessarily burdensome.

Additionally, there are groups of two or more mandates that, while they do not all require the same action, can all be satisfied by the same action. For example, a set of authority documents may contain the following mandates:

1. encrypt the password file
2. encrypt the password file using the Advanced Encryption Standard
3. encrypt the password file using AES-256

While these mandates do not all require that the AES-256 encryption technique be used to encrypt the password file, they are all satisfied by using RES-256 to encrypt the password file. Like groups of mandates that all require the same action, multiple separate mandates that can be satisfied by the same action make compliance efforts unnecessarily burdensome.

To address the high levels of difficulty and burden that attend conventional compliance processes, the inventor has conceived and reduced to practice a hardware and/or software facility for providing automatic and semi-automatic compliance tools ("the facility"). The facility processes a set of authority documents from one or more issuers, first identifying the mandates that each contains. The facility constructs a set of highly-readable common controls ("controls") that collectively represent all of these mandates, in some cases using a single control to represent multiple mandates that are redundant across the authority document set. The facility links each control to the mandates it represents.

A person performing a compliance review for a particular organization can select the authority documents that are included in the set. Where such a person has identified evidence substantiating the organization's compliance with a particular control, the facility permits them to attach this substantiation evidence to that control. Once substantiation evidence is attached to each of the controls, the organization has demonstrated full compliance with all of the authority documents in the set. In an audit or enforcement action for a particular authority document, the facility uses the links between the authority document's mandates and the controls that represent them to identify the subset of the controls that represent the authority document, and presents the evidence attached to those controls. The evidence can be presented in the context of the controls, or in the original context of the authority document and its mandates. In some embodiments, the facility also presents, for each of the mandates, justification that the corresponding control adequately represents the mandate.

In some embodiments, the facility constructs the controls representing a set of authority documents by looping through each of the mandates contained by each authority document of the set. In some embodiments, this involves looping through each section, paragraph, or citation of the authority document to determine its applicability for mapping, then collecting the mandates present in each applicable section, paragraph, or citation of the authority document. For each mandate, the facility determines whether the mandate is represented by an existing control by looping through the controls and rating the level of similarity between the mandate and each control. If any of the controls has a level of similarity to the mandate that exceeds a similarity threshold, it is considered to represent the mandate, and the mandate is linked to it. If none of the existing controls has a level of similarity to the mandate that exceeds the threshold, the facility creates a new control from the mandate, and links the mandate to the new control.

In some embodiments, the facility performs similarity rating between a mandate and a control as follows: For each the mandate and the control, the facility identifies the primary verb, as well as the primary noun that is the object of the primary verb. The facility determines a similarity rating between the mandate and the control with reference to a semantic graph that documents relationships between terms (words or phrases). In the graph, each term is a node, connected to nodes representing directly-related terms by an edge that identifies the nature of the relationship. For example, a first node for the term "smartphone" may be connected to a second node for the term "portable electronic device" by an edge that indicates that the term of the first node is a type of the term of the second node. The length of the shortest route between the primary verbs of the mandates and the control is determined, in terms of the number of edges (or "hops") of the semantic graph that must be traversed to reach one from the other. The graph distance between the primary nouns of the pair is similarly determined. The similarity rating for the pair of mandates is then determined such that the rating is inversely related to each verb distance and noun distance, with verb distance being weighted more heavily, such as 50% more heavily. In some embodiments, the facility uses this process to rate the similarity of two mandates.

In constructing a new control from a mandate, in some embodiments, the facility determines a readability score for the mandate by combining (a) average sentence length, (b) average number of syllables per word, (c) square root of number of words having more than two syllables, (d) average number of words per sentence, and (e) percentage of words that have more than two syllables. In various embodiments, the facility uses this score to, for example (1) filter controls to collect those whose score is either greater than or less than some threshold; (2) provide real-time feedback about readability to an author as they are writing a control; (3) declining to accept a control whose score is below a particular threshold; (4) automatically adopt a mandate whose score is above a threshold as a control; etc. As the control is changed to deviate from the phrasing of the mandate to improve the control's readability, the facility continues to assess the similarity between the mandate and the changing control to guard against clarification that comes at the expense of accuracy.

In some embodiments, the facility maintains its controls over time, substituting in controls synonyms of terms formerly used in the control that are used at a significantly higher rate.

By performing in some or all of the foregoing ways, embodiments of the facility provide greater certainty in compliance at a meaningfully lower burden.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data; an operating system including a kernel, and device drivers; a persistent storage device 103, such as a hard drive or flash drive for persistently storing programs and data; a computer-readable media drive 104; such as a floppy, CD-ROM; DVD, or Blu-ray drive, for reading programs and data stored on a computer-readable medium; and a network connection 105 for connecting the computer system to other computer systems to send and/or receive data, such as via the Internet or another network and its networking hardware; such as switches, routers, repeaters; electrical cables and optical fibers, light emitters and receivers, radio transmitters and receivers; and the like. In various embodiments, the computer systems are owned and operated by the operator of the facility; owned by the operator of the facility but operated by a third party; hardware dedicated to the operator of the facility and owned and operated by a third party; and/or owned and operated by a third party on behalf of the operator of the facility and other unrelated tenants. In various embodiments, the facility executes on these computing systems directly, and/or via one or more layers of virtualization. While computer systems configured as described above are typically used to support the operation of the facility, those skilled in the art will appreciate that the facility may be implemented using devices of various types and configurations, and having various components.

Figure 2A:
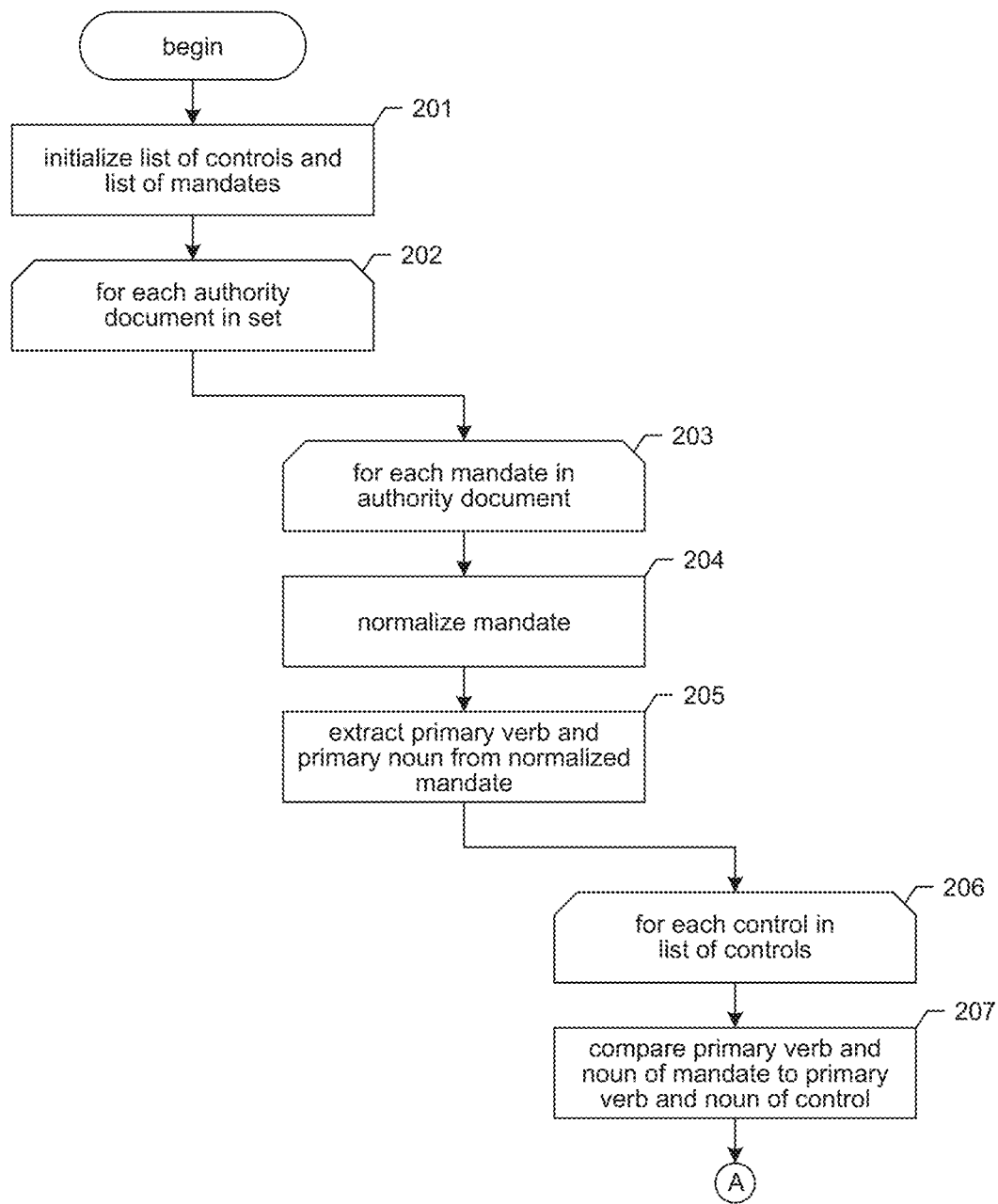
FIG. 2A is a first part of a flow diagram showing a process performed by the facility in some embodiments to represent mandates contained by one or more authority documents by common controls.
Figure 2B:
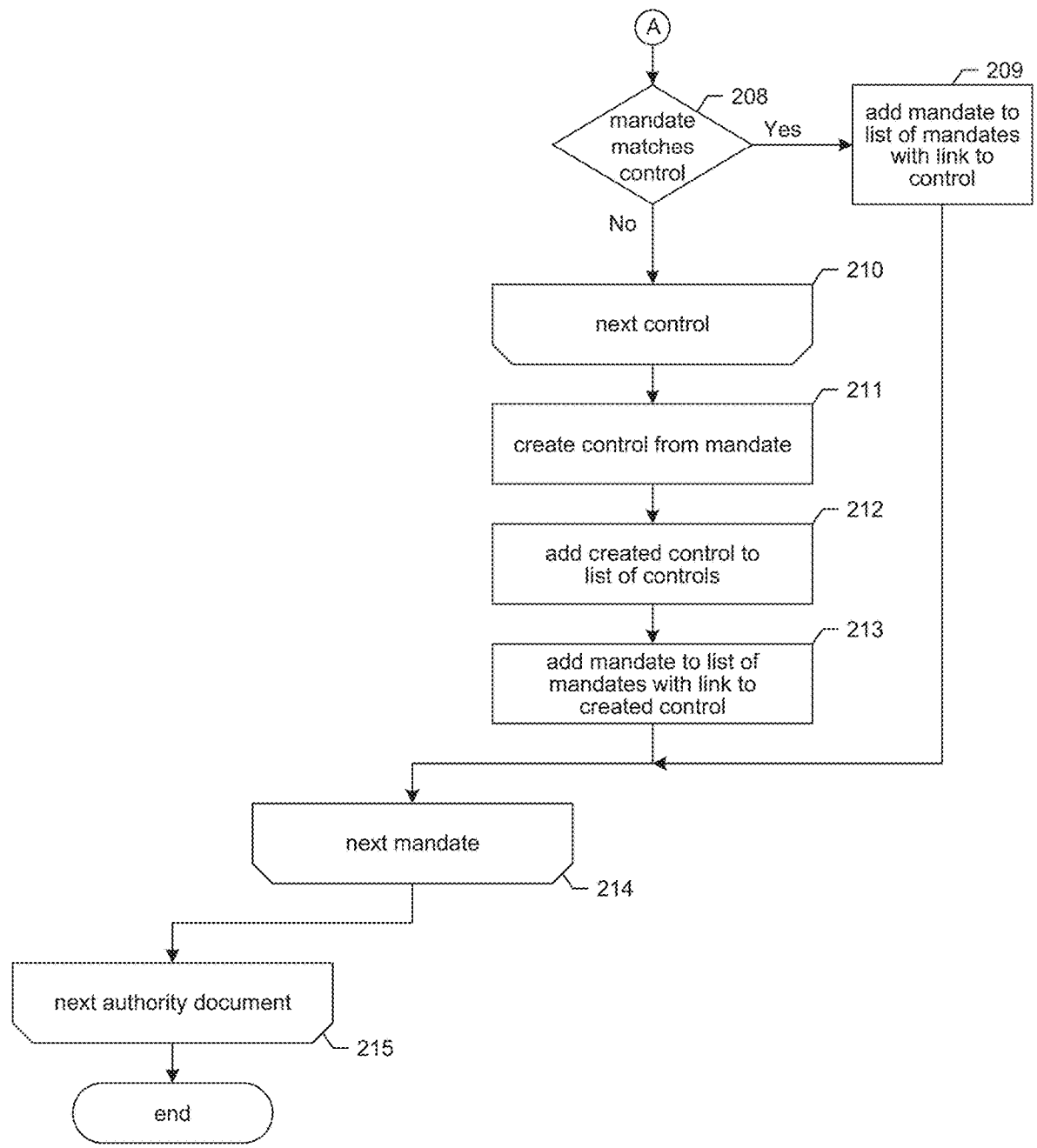
FIG. 2B is a second part of the flow diagram from FIG. 2A, showing the process performed by the facility in some embodiments to represent mandates contained by one or more authority documents by common controls.

FIG. 2 is a flow diagram showing a process performed by the facility in some embodiments to represent mandates contained by one or more authority documents by common controls. Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act; etc.

In act 201, the facility initializes a list of controls and a list of mandates to both be empty. In some embodiments, the facility represents the initialized list of controls as a control table—such as control table 300 shown in FIG. 3 and discussed below; and represents the initialized list of mandates as a mandate table—such as mandate table 800 shown in FIG. 8 and discussed below.

In acts 202-215, the facility loops through each authority document in the set of authority documents. In some embodiments, this set of authority documents is defined by an organization on whose behalf compliance is being performed.

In acts 203-214, the facility loops through each mandate in the present authority document. In some embodiments, the facility identifies each of these mandates by identifying a different verb-noun pair occurring the authority document. In some embodiments, multiple noun-verb pairs may occur in the same section, paragraph, or other portion of the facility document. In some embodiments, the facility establishes multiple mandates from a compound combination of verbs and nouns, such as a single verb with two objects, or two verbs with the same object.

In act 204, the facility normalizes the mandate. In some embodiments, normalizing the mandate involves, for example, transforming a mandate stated by the authority document as a question into a declarative, imperative statement. For example, in some embodiments, the facility normalizes the mandate "is identity information secured?" by transforming it to "secure identity information."

In act 205, the facility extracts from the normalized mandate the primary verb, as well as the primary noun that is the object of the primary verb. To continue the above example, from the normalized mandate "secure identity information", the facility extracts the primary verb "secure" and the primary noun "identity information".

In acts 206-210, the facility loops through each control in a list of controls.

FIG. 3 is a table diagram showing a control table used by the facility in some embodiments to store a list of controls that it has constructed to represent mandates in authority documents. The control table 300 is made up of rows, such as row 301, each representing a different control constructed by the facility. Each row is divided into the following columns: control ID column 311 containing a control ID uniquely identifying the control among those constructed by the facility; a text column 312 containing the text of the control; a primary verb column 313 containing the control's primary verb term; and a primary noun column 314 containing the control's primary noun term. For example, in the state represented by control table 300, the facility has constructed a single control, which is represented by row 301. That control has control ID "1111", has the text "protect all personally identifiable information", has the primary verb "protect", and has the primary noun "personally identifiable information".

While FIG. 3 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Returning to FIG. 2, in act 207, the facility compares the primary verb and noun of the present mandate to the primary verb and noun of the present control.

Figure 4:
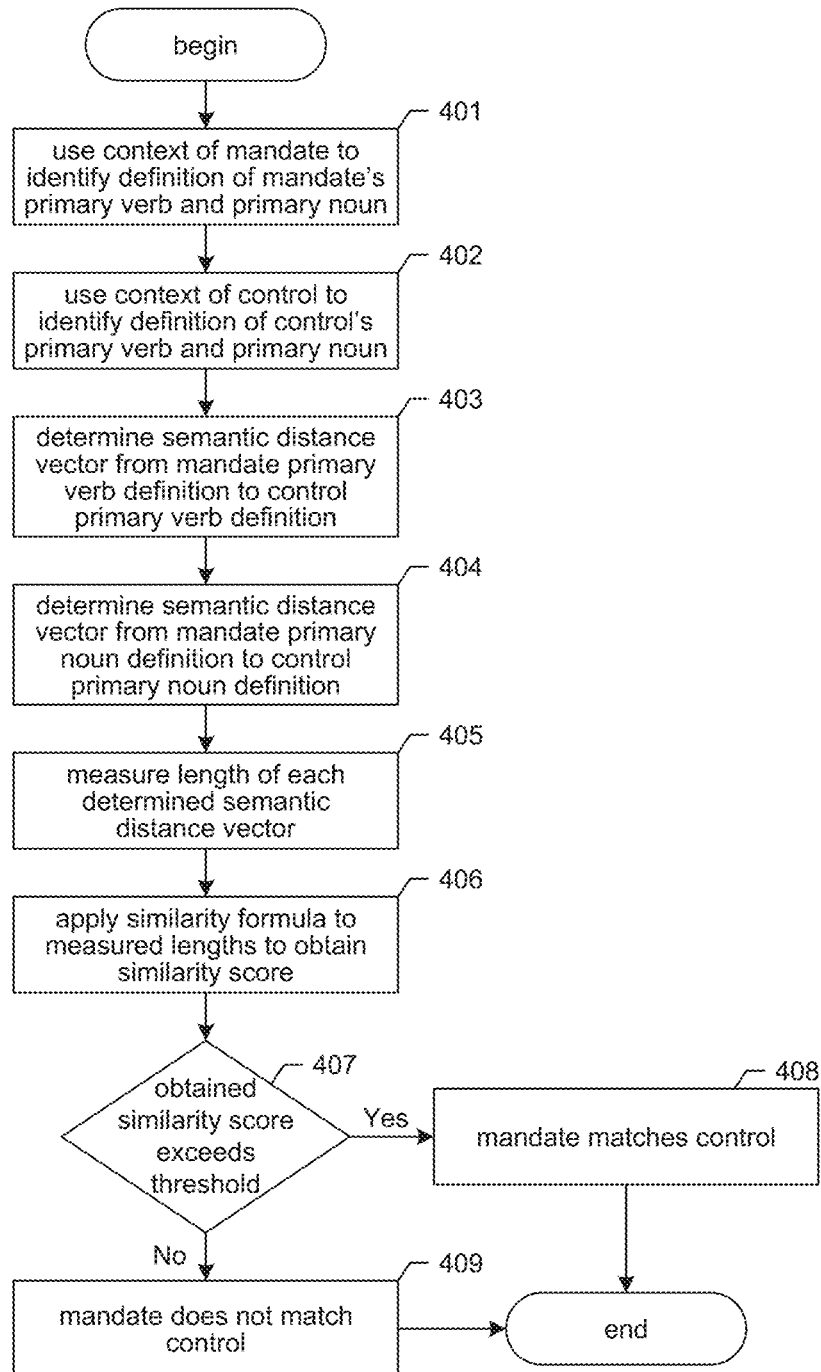
FIG. 4 is a flow diagram showing a process performed by the facility in some embodiments to compare a mandate to a control.

FIG. 4 is a flow diagram showing a process performed by the facility in some embodiments to compare a mandate to a control. In act 401, the facility uses the context of the mandate to identify definitions—or senses—of the mandate's primary verb and primary noun. Continuing the example of the sample mandate above, for the primary verb "secure", the facility identifies this definition: "to protect against danger, harm or threats; safeguard." For the mandate's primary noun "identity information", the facility identifies the following definition: "the data that is stored about each user's identity".

In act 402, the facility uses the context of the control to identify definitions of the control's primary verb and primary noun. For the control shown in row 301 of control table 300, the facility identifies the following definition for the primary verb "protect": "in computing: to limit access to or the use of data, primary storage memory, memory address, etc.". For the control's primary noun "personally identifiable information", the facility identifies the following definition: "information which can be used to distinguish or trace and individual's identity, such as their name, social security number, biometric records, etc., alone, or combined with other personal or identifying information which is linked or linkable to a specific individual such as date and place of birth; mother's maiden name, etc."

Figure 5:
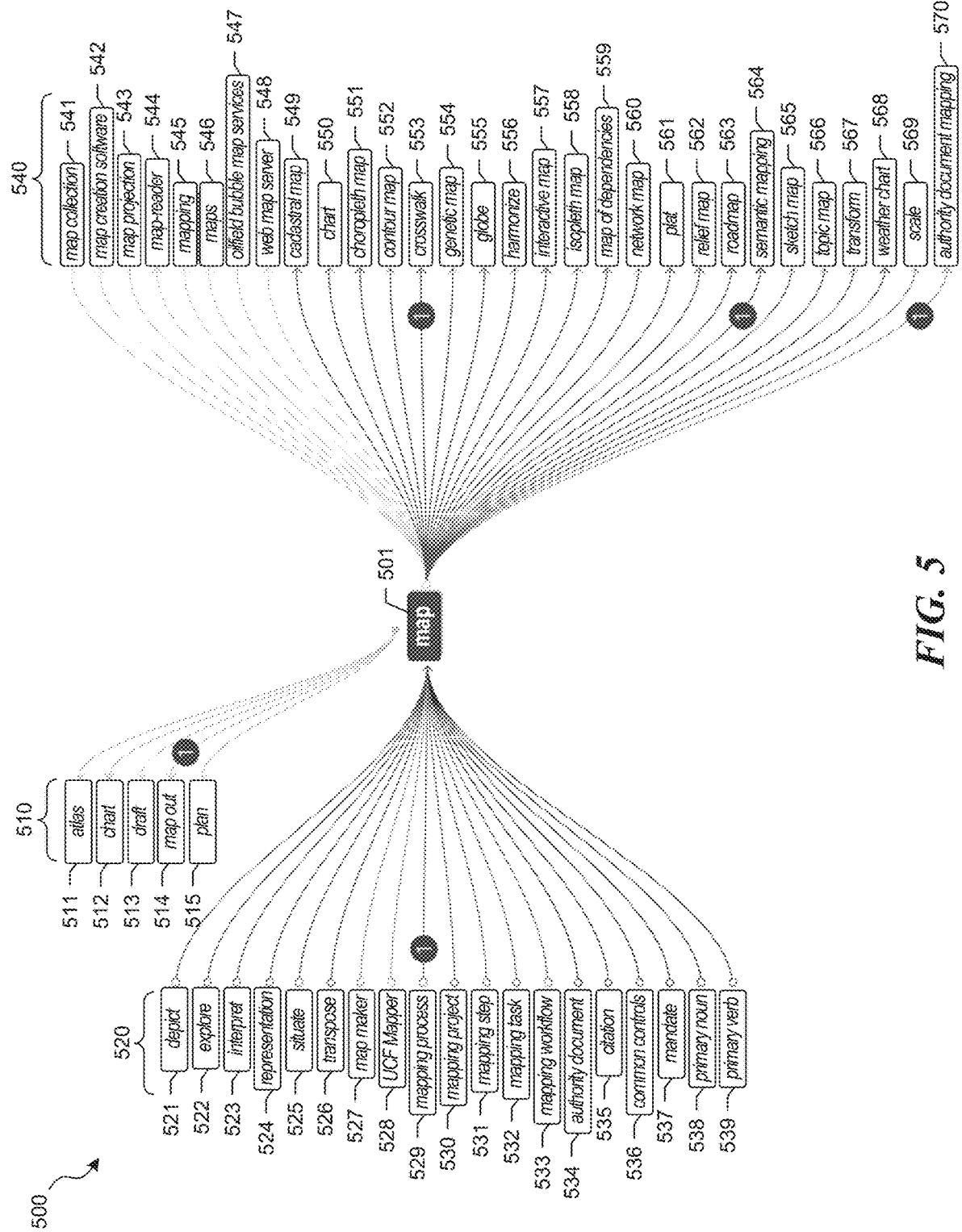
FIG. 5 is a sample semantic graph representative of the type used by the facility in some embodiments to determine semantic distance vectors.

In act 403, the facility determines a semantic distance vector, or "path," from the mandate's primary verb definition to the control's primary verb definition. FIG. 5 is a sample semantic graph representative of the type used by the facility in some embodiments to determine semantic distance vectors. The graph 500 is made up of nodes each representing a definition or sense of a term, such as nodes 529, 501, and 554. The nodes are connected by edges, or "hops," each of which represents a direct semantic relationship between the term definitions represented by the connected nodes. For example, based upon the edge between, nodes 529 and 501 have a direct relationship, as do nodes 501 and 554. The relationships shown in graph 500 are all with respect to the term definition for the term "map", represented by node 501. In graph 500, the differing positions of groups of nodes 510, 520, and 540 denote a nature of the semantic relationship between the nodes in each of these groups and subject term definition represented by node 501. In particular, the nodes of node group 510 are synonyms of the term definition represented by node 501; the nodes of node group 520 are broader concepts than the term definition of node 501; and the nodes of node group 540 are narrower concepts than the term definition of node 501. In particular, as examples, the definition of the term "mapping process" represented by node 529 is broader than the definition "map" represented by node 501; and the definition of "map" represented by node 501 is broader than the definition of "semantic mapping" represented by node 554. It should be recognized that graph 500 shown in FIG. 5, by depicting only the direct relationships that this single term definition has with other term definitions, is a very small subset of the overall semantic map that contains all relationships between all pairs of term definitions. In some embodiments, the facility determines a length or distance between a pair of term definitions based upon the smallest number of edges or hops that must be traversed to reach one from the other, in a "vector" or a "path" through these nodes. For example, in graph 500, the definition of "map" represented by node 501 is a single hop away from node 529 for a definition of the term "mapping process"; node 554 for a definition of "semantic mapping", on the other hand is two hops away from node 529. Term definitions whose nodes are closer to one another are regarded as more highly related. In some embodiments, edges representing different relationships have different weights. For example, because the nodes of node group 510 are regarded as synonyms of the subject node 501, in some embodiments, the facility uses a weight less than an entire hop between any of these synonym nodes and the subject node, such as 0.75, 0.5, 0.25, or 0.

Figure 6:
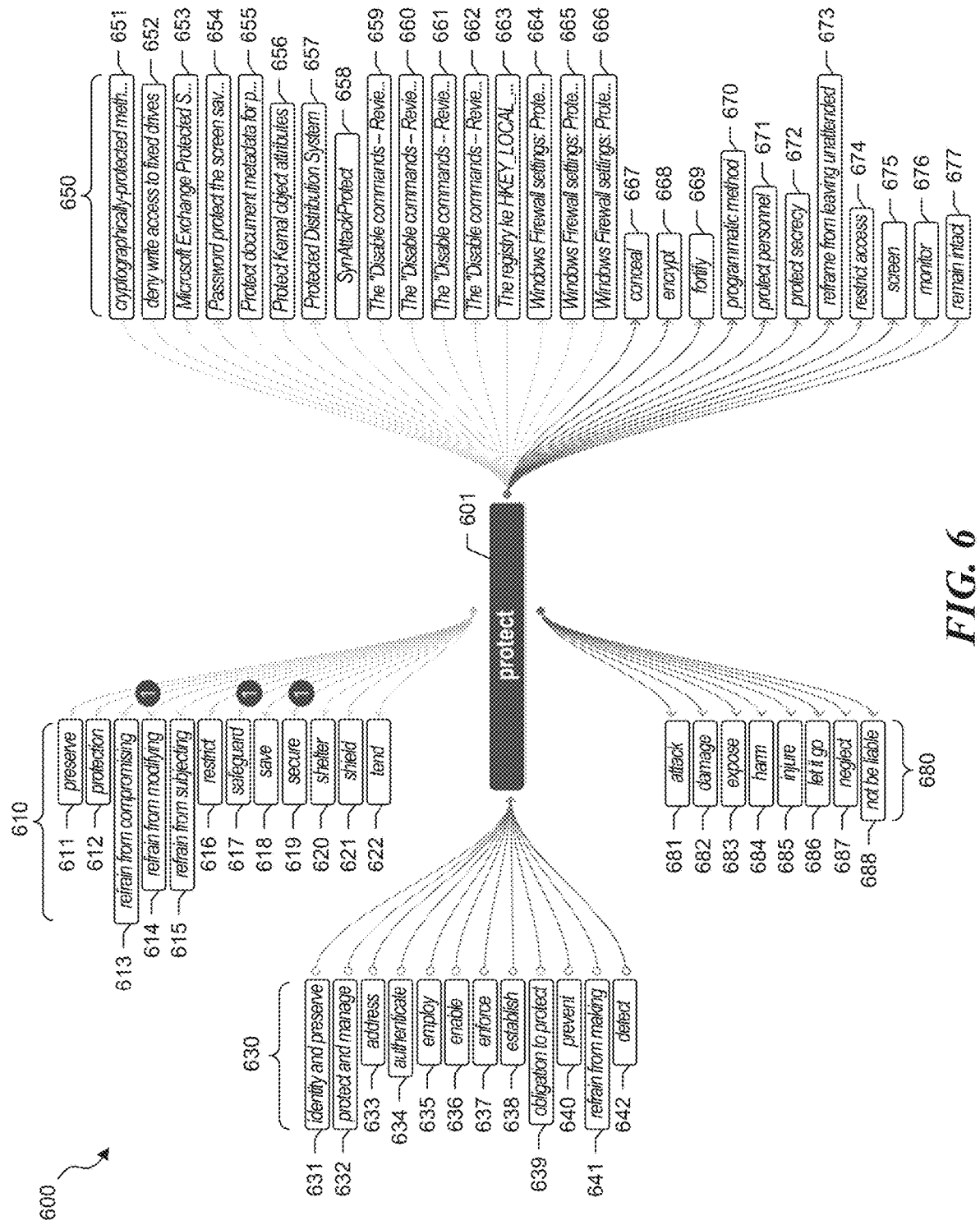
FIG. 6 is a semantic graph used by the facility to determine a semantic path from a mandate primary verb "secure" and the control primary verb "protect".

FIG. 6 is a semantic graph used by the facility to determine a semantic path from a mandate primary verb "secure" and the control primary verb "protect". In particular, graph 600 in FIG. 6 shows node 601 for the definition of protect noted above is a single hop from node 619 for the definition of "secure" noted above; the semantic distance vector between them determined by the facility is therefore "secure→protect".

Returning to FIG. 4, in step 404, the facility determines a semantic distance vector from the mandate primary noun definition to the control primary noun definition. Continuing the example above, this is determining a semantic distance vector from the definition noted above for the mandate primary noun "identity information" to the definition noted above for the control primary noun "personally identifiable information".

Figure 7:
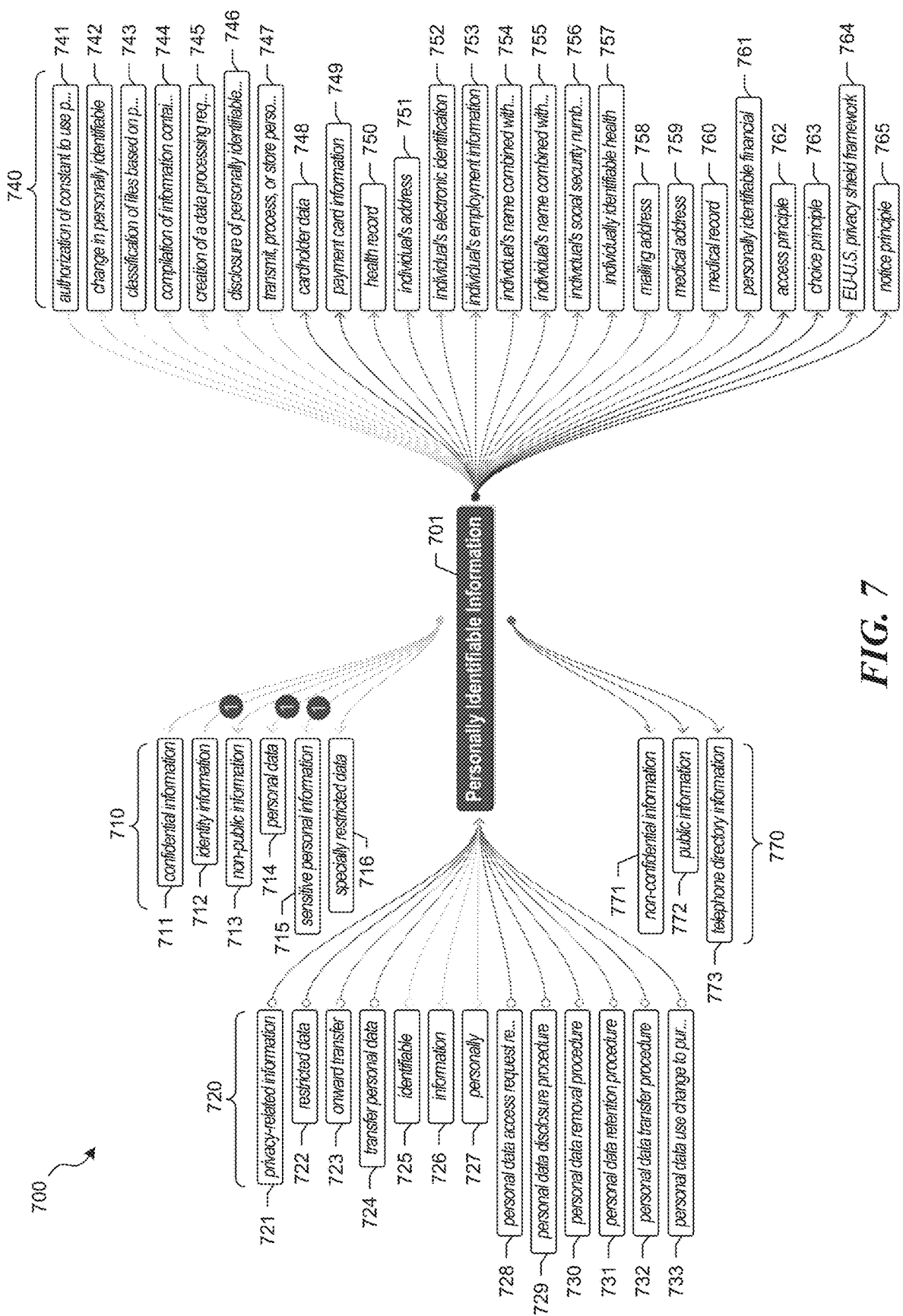
FIG. 7 is a semantic graph used by the facility to determine a semantic distance vector from mandate primary noun definition to control primary noun definition.

FIG. 7 is a semantic graph used by the facility to determine a semantic distance vector from mandate primary noun definition to control primary noun definition. In particular, in graph 700, it can be seen that there is a single hop between node 701 for the noted definition of "personally identifiable information" and node 712 for the noted definition of the term "identity information". Further, the semantic distance vector determined by the facility between these two term definitions is "identity information→personally identifiable information".

Returning to FIG. 4, in act 405, the facility measures the length of each of the semantic distance vectors determined in acts 403 and 404, arriving at a length of 1 for each as discussed above. In act 406, the facility applies a similarity formula to the lengths measured in act 405 to obtain a similarity score. In some embodiments, the facility uses a formula in which vector length between verbs is weighted more heavily than vector length between nouns. In some embodiments, the facility uses the following formula:

$$\text{similarity score} = 1 - \frac{0.75 \times \text{verb vector length} + 0.5 \times \text{noun vector length}}{100}$$

In applying the formula shown above, the facility determines a similarity score of 87.5% between the present mandate and the present control.

In act 407, if the similarity score obtained in act 406 exceeds a similarity threshold, then the facility continues in act 408, else the facility continues in act 409. In various embodiments, the facility uses various similarity thresholds, such as 75%, 80%, 85%, or 90%. For purposes of the example, the facility applies a threshold of 85%, which is satisfied in the example. In act 408, where the threshold is satisfied, the facility determines that the mandate matches the control, and this process concludes. In act 409, where the threshold is not satisfied, the facility determines that the mandate does not match the control, and this process concludes.

Returning to FIG. 2, in act 208, if the present mandate matches the present control based upon the comparison of act 207, then the facility continues in act 209, else the facility continues in act 210. In act 209, the facility adds the present mandate to the list of mandates, and includes a link to the control. FIGS. 8 and 9 show the addition of the mandate that is the subject of the example to the list of mandates maintained by the facility.

FIG. 8 is a table diagram showing sample contents of a mandate table used by the facility in some embodiments to maintain a list of mandates that have been linked to controls while in a first state. The mandate table 800 is made up of rows, here only row 801, each corresponding to a different mandate occurring in a particular authority document. Each row is divided into the following columns: mandate ID column 811 containing a mandate ID uniquely identifying this mandate among all of those analyzed by the facility; document ID column 812 containing an identifier adequate to identify the authority document in which the mandate occurs; a document section column 813 containing information, such as a section number, usable to identify a portion of the authority document in which the mandate occurs; a mandate ordinal column 814 containing an indication of which mandate in the identified document section or other portion the row corresponds to; a normalized mandate column 815 containing a version of the mandate that has been normalized into a declarative, imperative statement; a primary verb column 816 containing the primary verb identified for the mandate by the facility; a primary noun column 817 containing the primary noun identified for the mandate by the facility; a control ID column 818 containing an identifier for the control to which the facility has linked the mandate; a verb vector column 819 containing the semantic distance vector determined by the facility from the mandate primary verb definition to the control primary verb definition; a noun vector column 820 containing the semantic distance vector determined by the facility from the mandate primary noun definition to the control primary noun definition; and a similarity score column 821 containing a similarity score determined by the facility between the mandate and the control to which it is linked. For example, row 801 indicates that a mandate assigned the mandate ID "111111" occurs in the authority document having document ID "111", in section "2(c)(4)", in the first position; that the facility has normalized the mandate to "safeguard sensitive personal information" where the primary verb is "safeguard" and the primary noun is "sensitive personal information"; that the mandate has been linked to the control having control ID "1111, to which row 301 of control table 300 corresponds; that the verb vector is "safeguard→protect" and the noun vector is "sensitive personal information→personally identifiable information"; and the similarity score between this mandate and the linked control is 87.50%.

FIG. 9 is table diagram showing sample contents of a mandate table used by the facility in some embodiments to maintain a list of mandates that have been linked to controls while in a second state. It can be seen that, in mandate table 900, row 902 has been added to row 901 which was formerly present in mandate table 800. It can be seen that the information about the mandate containing new row 902 matches that discussed about the example above.

Returning to FIG. 2, after act 209, the facility continues in act 214. In act 214, if one or more additional mandates remain to be processed in the present authority document, then the facility continues in act 203 to process the next mandate in the present authority document, else the facility continues in act 215.

Where the present mandate does not match the present control in act 208, the facility continues in act 210. In act 210, if additional controls remain in the list of controls to be processed, then the facility continues in act 206 to process the next control on the list, else the facility continues in act 211, In act 211, the facility creates a control from the present mandate.

Figure 10:
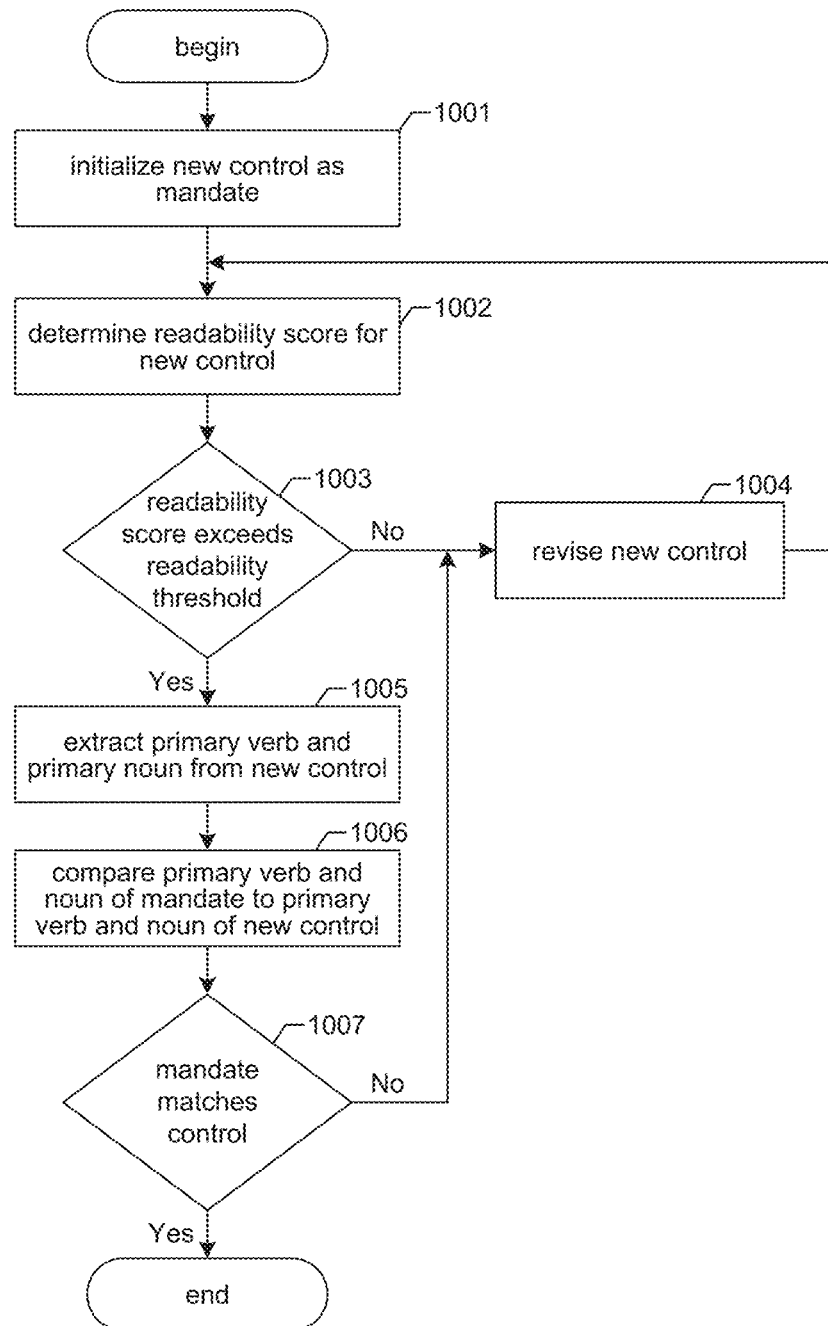
FIG. 10 is a flow diagram showing a process performed by the facility in some embodiments to create a new control from a mandate.

FIG. 10 is a flow diagram showing a process performed by the facility in some embodiments to create a new control from a mandate. In act 1001; the facility initializes the new control to be the same as the normalized mandate. In act 1002, the facility determines a readability score for the new control. In some embodiments, the facility uses one or more of the following formulas in act 1002:

Rudolph Flesch's Reading Ease Formula;
Flesch's Grade Level;
J. Peter Kinkaid's Flesch-Kinkaid Index;
Robert Gunning's Fog Index;
The SMOG Readability Formula;
Fry's Readability Graph;
New Dale-Chall formula;
Powers-Sumner-Kear Readability Formula;
FORCAST readability formula; and
Spache readability formula.

In some embodiments; the facility determines a grade for the readability of a control or mandate using measures of each the minimum age or grade level needed to understand the control or mandate, and the clarity of the control or mandate, as follows:

The Flesch-Kincaid Grade Level Readability Formula

Step 1: Calculate the average number of words used per sentence.

Step 2: Calculate the average number of syllables per word.

Step 3: Multiply the average number of words by 0.39 and add it to the average number of syllables per word multiplied by 11.8.

Step 4: Subtract 15.59 from the result.

The specific mathematical formula is:

$$FKRA = (0.39 \times ASL) + (11.8 \times ASW) - 15.59$$

Where,

FKRA=Flesch-Kincaid Reading Age
ASL=Average Sentence Length (i.e., the number of words divided by the number of sentences)
ASW=Average number of Syllable per Word (i.e., the number of syllables divided by the number of words)

The SMOG Readability Formula as Applied to Mandates

Step 1: Count every word with three or more syllables, even if the same word appears more than once.

Step 2: Calculate the square root of the number arrived at in Step 1 and round it off to nearest 10.

Step 3: Add 3 to the figure arrived at in Step 2 to know the SMOG Grade, i.e., the reading grade that a person must have reached if he is to understand fully the text assessed.

$$SMOG = 3 + \text{Square Root of Polysyllable Count}$$

The Clarity index

Step 1: Count the number of sentences.
Step 2: Count the number of words.
Step 3: Divide the number of words by the number of independent clauses to get the average mandate length. (The target average is 15 words per sentence.)
Step 4: Count the number of words that have three syllables or more.
Step 5: Divide the number of long words by the total of words to determine the percentage of long words. (The target is 15 percent.)
Step 6: Add the average sentence length to the percentage of long words.

$$Clarity = ((100 - (PercentLong + AVGLength))/100) - Subject$$

Where,
  Subject=the number of words in the noun or noun phrase divided by 100
  Words=Number of words in the sentence
  Clauses=Number of clauses in the sentence
  AVGLength=Words/Clauses
  ThreeSyllableCount=Number of words with three or more syllables
  PercentLong=ThreeSyllableCount/Words
The Mandate Readability Grade The Mandate Readability Grade builds upon the three calculations above and creates a letter grade (A through F) that can be assigned to the text.
  Step 1: Average the Flesch-Kincaid and SMOG readability scores.
  Step 2: Multiply that average by the Clarity Index.
  Step 3: Apply a letter grade.

$$MRG=Case(MRI<3;A;MRI<5;B;MRI<7;C;MRI<9;D;F)$$

Where,
  AVGScore=average(FKRA;SMOG)
  MRI=AVGScore*(1−Clarity)

In act 1003, if the readability score determined by the facility in act 1002 exceeds a readability threshold; then the facility continues in act 1004, else the facility continues in act 1005. In various embodiments, the facility uses various values of this threshold, such as a readability grade at or above A; B; or C. In act 1004, the facility revises the new control in an effort to make it more readable. In some embodiments, act 1004 involves prompting a person to revise the new control. After act 1004, the facility continues in act 1002.

In act 1005, where the readability exceeds the readability threshold, the facility extracts the primary verb and primary noun from the present version of the new control. In act 1006, the facility compares the primary verb and noun of the mandate to the primary verb and noun extracted from the new control in act 1005. In act 1007, if the mandate adequately matches the control, then this process concludes, else the facility continues in act 1004 to further revise the new control. In some embodiments, the facility uses the same matching threshold in act 1007 as in act 208. In some embodiments, the facility uses a threshold in act 1007 that is higher than the threshold it uses in act 208.

Returning to FIG. 2, in act 212, the facility adds the new control created in act 211 to its list of controls.

FIG. 11 is a table diagram showing sample contents of the control table used by the facility in some embodiments, updated to reflect the additionally created control. It can be seen by comparing control table 1100 shown in FIG. 11 to control table 300 shown in FIG. 3 that the facility has added row 1102 representing a new control for the text "secure premises."

Returning to FIG. 2, in act 213, the facility adds the present mandate to its list of mandates, along with a link to the control created in act 212.

FIG. 12 is a table diagram showing a further state of the mandate table updated to include mandate links to the new control added to the list of controls. By comparing mandate table 1200 shown in FIG. 12 to mandate table 900 shown in FIG. 9, it can be seen that the facility had added row 1203 which links the present mandate having the normalized text "secure immediate physical premises" to the new control represented by row 902 of mandate table 900 via control ID "2222".

Returning to FIG. 2, after 213, facility continues in act 214. In act 214, if additional mandates remain in the present authority document to be processed, the facility continues in act 203, else the facility continues in act 215. In act 215, if addition authority documents remain in the set of authority documents to be processed, then the facility continues in act 202 to process the next authority document in the set, or else this process concludes.

Figure 13:
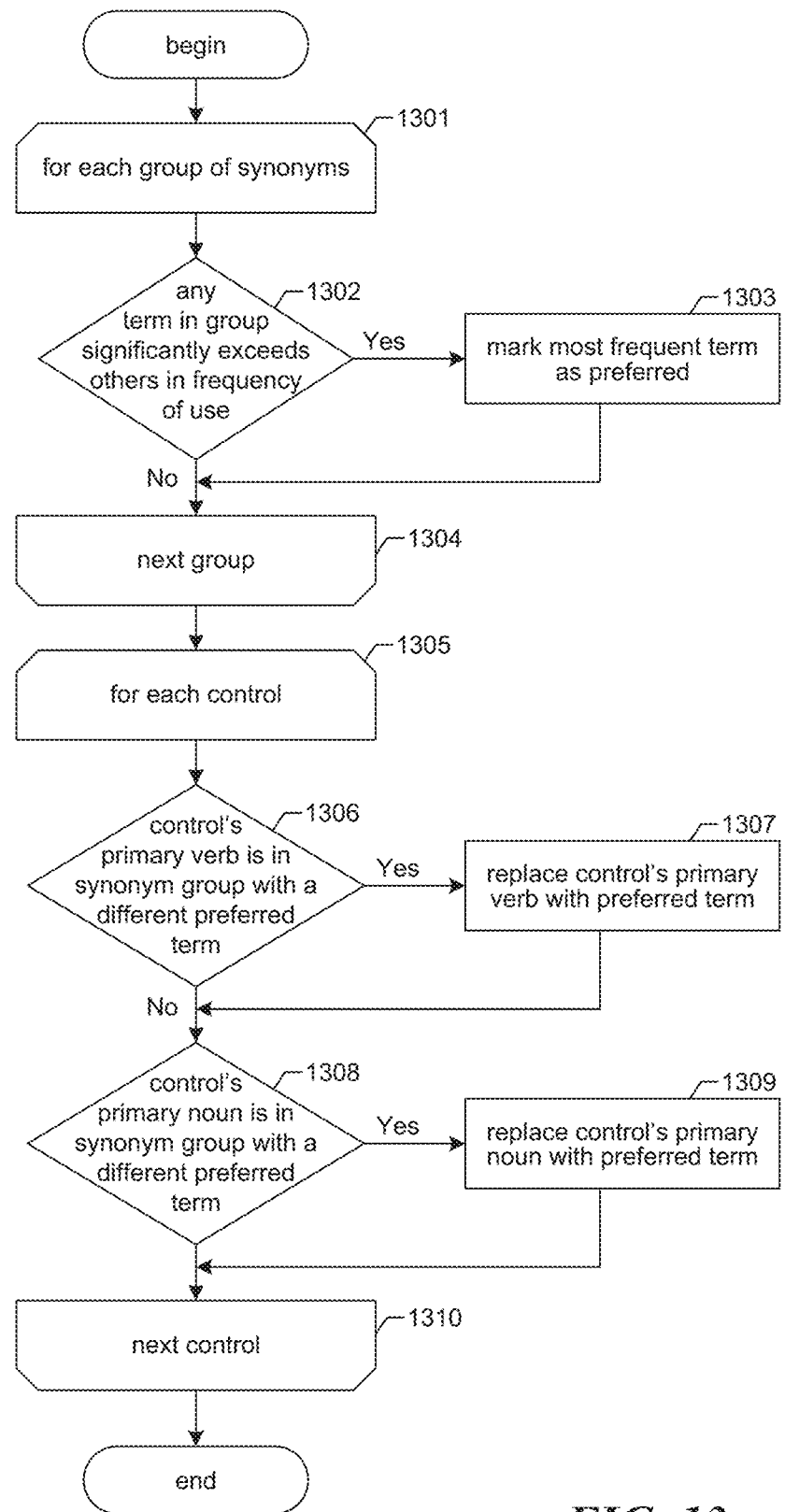
FIG. 13 is a flow diagram showing a process performed by the facility in some embodiments to maintain the currency of languages used in the controls it has created.

FIG. 13 is a flow diagram showing a process performed by the facility in some embodiments to maintain the currency of language used in the controls it has created. In some embodiments, the facility performs this process periodically, such as monthly, quarterly, or yearly. In act 1301-1310, the facility loops through each of a number of groups of synonymous term definitions. In act 1302, if any term in the present group significantly exceeds other terms in the present group in frequency of use, then the facility continues in act 1303, else the facility continues in act 1304. In act 1303, the facility marks the most frequent term as preferred. In some embodiments, the facility only marks the most frequent term as preferred if its frequency is at least a threshold percentage higher than the next largest frequency, such as 25% higher. After act 1303, the facility continues in act 1304.

FIG. 14 is a table diagram showing sample contents of preferred term table used by the facility in some embodiments to track preferred terms occurring in groups of synonymous terms. The preferred term table 1400 is made up of rows, such as rows 1401-1407. Each of the rows corresponds to a term that is in a particular group of synonyms. Each row is divided into the following columns: a group ID column 1411 containing an identifier uniquely identifying the group of synonymous terms; a term column 1412 identifying the term to which the term corresponds; a frequency column 1413 indicating the number of occurrences of the term in some corpus; and a preferred column 1414, indicating whether the term to which the role corresponds is the preferred term in its synonym group. In various embodiments, the corpus used by the facility to determine term frequency is the selected set of authority documents; a larger set of authority documents; a set of learned papers, articles, text books, etc. For example, row 1401 indicates that, in the group of synonyms having group ID "1111111", the term "personal identifiable information" occurs 377 times, and is not a preferred term for this group of synonyms. On the other hand, row 1405 indicates that in the same synonym group, the term "personal data" occurred 743 time in the corpus; because this frequency is significantly higher than the next larger frequency in the synonym group, the facility group determines that this term is preferred in the synonym group Returning to FIG. 13, in act 1304, if additional groups of synonyms remain to be processed, then the facility continues in act 1301 to process the next group of synonyms, else the facility continues in act 1305. In acts 1305-1310, the facility loops through each control in the facility's list of controls. In act 1306, if the present control's primary verb is in a synonym group in which a different term is preferred, then the facility continues in act 1307, else the facility continues in act 1308. In act 1307, the facility replaces the primary verb of the control with the preferred term in this synonym group. After act 1307, the facility continues in act 1308. In act 1308, if the control's primary noun is in a synonym group with a different preferred term, then the facility continues in act 1309, else the facility continues in act 1310. In act 1309, the facility replaces the control's primary noun with the preferred term from its synonym group. After act 1309, the facility continues in act 1310.

FIG. 15 is a table diagram showing sample contents of the control table used by the facility in some embodiments, updated to change the primary noun in corresponding text of a control to match a preferred term. By comparing control table 1500 shown in FIG. 15 with control table 1100 shown in FIG. 11, it can be seen that, in row 1501, the primary noun has been changed from "personally identifiable information" to the preferred term "personal data" identified in row 1405 of preferred term table 1400.

In some embodiments, the facility also updates the mandate table to reflect the change to the control. In particular, FIG. 16 is a table diagram showing sample contents of the mandate table used by the facility in some embodiments, updated to reflect the above-discussed change to a linked-to control. By comparing mandate table 1600 shown in FIG. 16 to mandate table 1200 shown in FIG. 12, it can be seen that the facility has updated rows 1601 and 1602 to contain the preferred term "personal data" in the place of "personally identifiable information".

Returning to FIG. 13, in act 1310, if additional controls remain in the facility's list of controls to be processed, then the facility continues in act 1305 to process the next control, else this process concludes.

Figure 17:
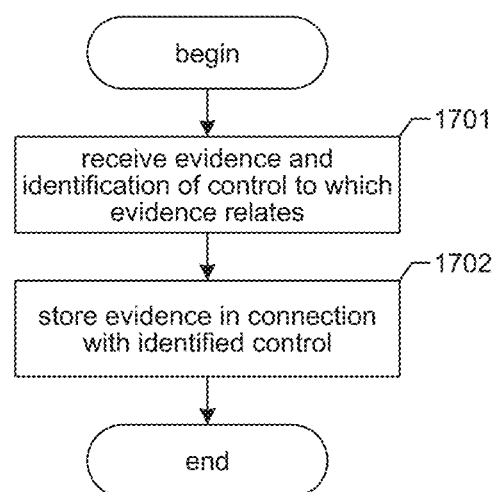
FIG. 17 is a flow diagram showing a process performed in some embodiments to attach evidence of compliance to particular controls.

FIG. 17 is a flow diagram showing a process performed in some embodiments to attach evidence of compliance to particular controls. In act 1701, the facility receives evidence from a user and information identifying a control to which the evidence relates. In act 1702, the facility stores the received evidence in connection with the identified control. After act 1702, this process concludes.

In some embodiments, for each control's primary noun, the facility tags the term with a particular named entity. For example, in some embodiments, the facility tags the primary noun "personal data" in the control to which row 1501 of control table 1500 shown in FIG. 15 as a "data field" named entity. Doing so has the effect that the facility's audit process samples any databases with data fields containing personal data, testing the system for secure configurations of that field and its associated tables. For the control to which row 1502 of control table 1500 corresponds, in some embodiments, the facility tags the primary noun "premises" as the named entity "asset", which includes types of buildings. In response, during an audit, the facility presents one or more questions that instruct an examiner to inspect sample premises of the organization, checking those premises's various security mechanisms, such as doors and their locks, windows and their locks, alarms, etc. for operability.

FIG. 18 is a table diagram showing sample contents of an evidence table used by the facility in some embodiments to store evidence of compliance provided in connection with the control. The evidence table 1800 is made up of rows, here only row 1801 each corresponding to a different piece of evidence attached to a particular control. Each row is divided into the following columns: a control ID column 1801 identified in control to which the evidence relates; an evidence document ID column 1812 usable to retrieve a document containing the provided evidence that the organization has satisfied the control; and an evidence description column 1813 having information describing the evidence provided by the document. For example, row 1801 indicates that evidence contained by document having document ID "99230912" constituting a report generated on Jan. 19, 2019 that lists all 7,231 of the organization's users and shows that the personal data of each is protected has been received for the control having control ID "1111".

Figure 19:
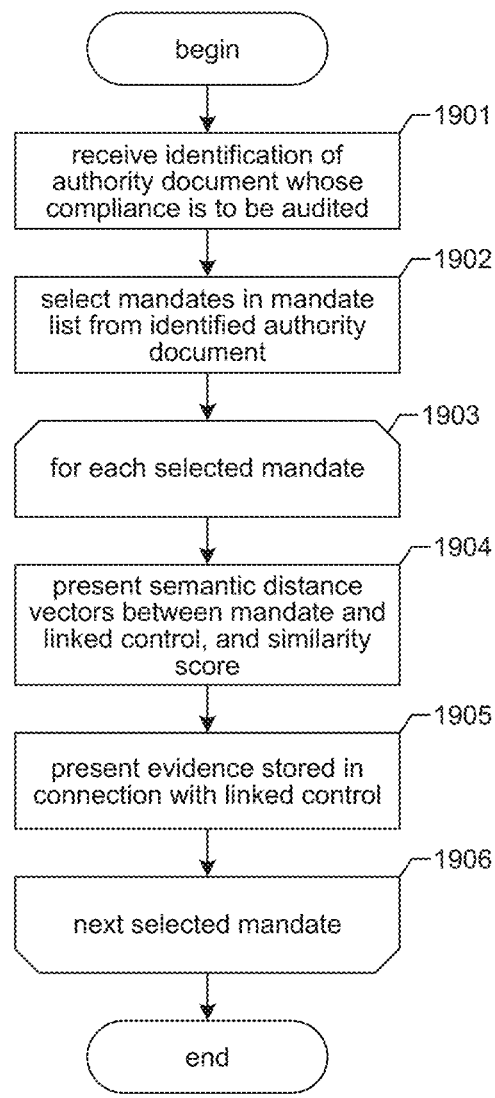
FIG. 19 is a flow diagram showing a process performed by the facility in some embodiments to support an auditing or assertion task in which the organization's compliance with mandates from one or more compliance documents must be shown.
Figure 20:
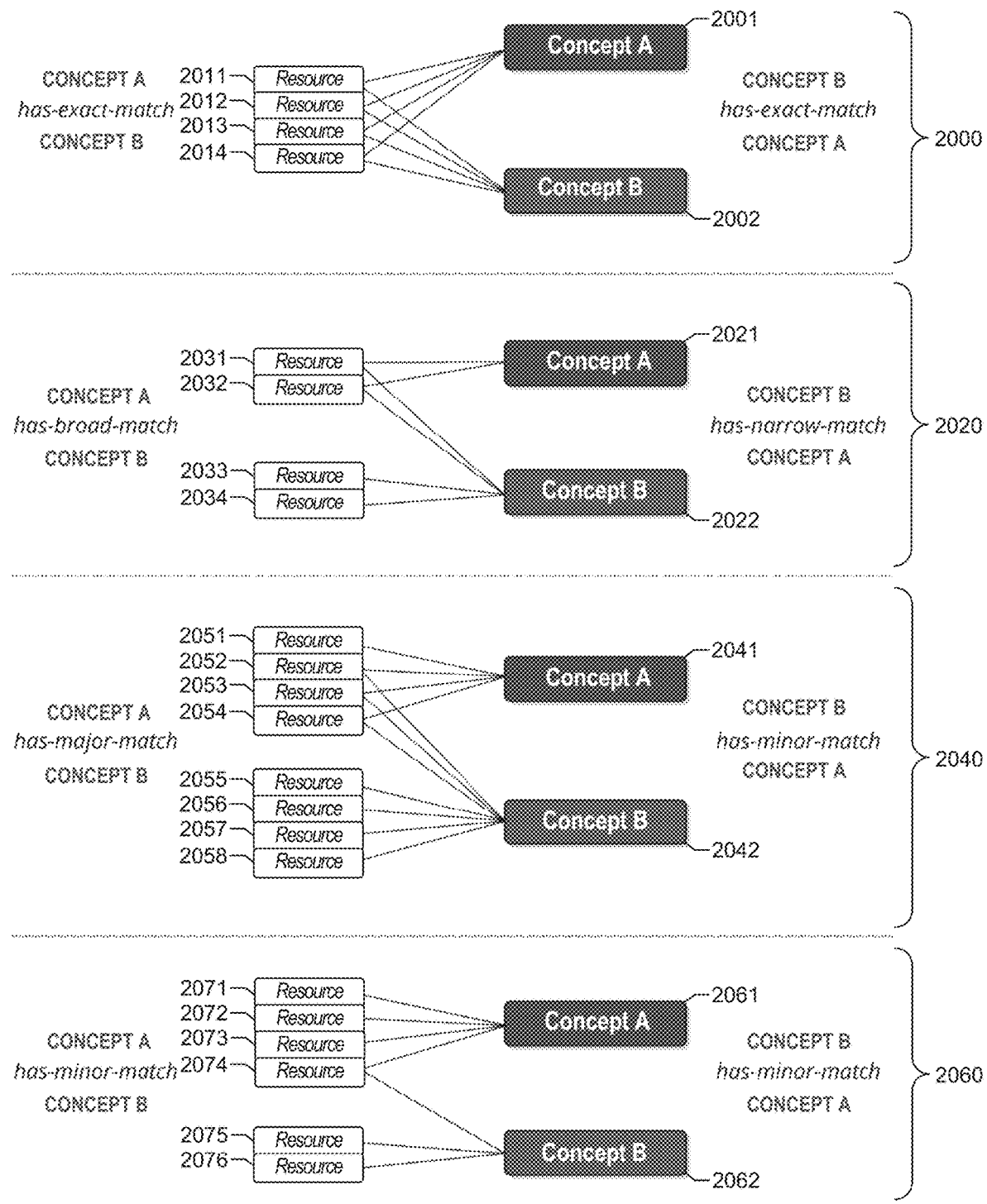
FIG. 20 is a semantic relationship diagram showing different types of semantic relationships.

FIG. 19 is a flow diagram showing a process performed by the facility in some embodiments to support an auditing or assertion task in which the organization's compliance with mandates from one or more compliance documents must be shown. In act 1901, the facility receives information identifying an authority document whose compliance is to be audited. In act 1902, the facility selects mandates in its mandate list that occur in the identified authority document. In acts 1903-1906, the facility loops through each mandate selected in act 1902. In act 1904, the facility presents evidence that the control to which the present selected mandate is linked adequately represents that selected mandate, such as presenting semantic distance vectors between the mandate and link control, and/or the similarity score determined between the mandate and the linked control. In act 1905, the facility presents evidence stored in connection with the linked control that shows the organization's compliance with the linked control. In some embodiments, the facility's presentation of evidence in act 1905 involves presenting that evidence in connection with each corresponding mandate, such as in the context of the content and native format of the authority document that contains the mandate. In act 1906, if additional selected mandates remain to be processed, then the facility continues in act 1903 to process the next selected mandate, else this process concludes, FIG. 20 is a semantic relationship diagram showing different types of semantic relationships. A section 2000 shows a semantic relationship between concept A 2001 and concept B 2002 where these two concepts have an exact match, because they both have relationships with the same set of four resources 2011-2014. Section 2020 shows a semantic relationship between concept A 2021 and concept B 2022 where concept A has a broad match with concept B, as concept B relates to the same two resources 2031-2032 that concept A does, as well as two additional resources 2033-2034. Section 2040 shows concept A 2041 and concept B 2042 where concept A has a major match with concept B: 75% of the four resources 2051-2054 with which concept A has a relationship are also the subject of a relationship with concept B. Section 2060 shows concept A 2061 and concept B 2062 where concept A has a minor match with concept B, in that only 25% of the four resources 2071-2074 with which concept A has a relationship are the subject of a relationship with concept B.

Figure 21:
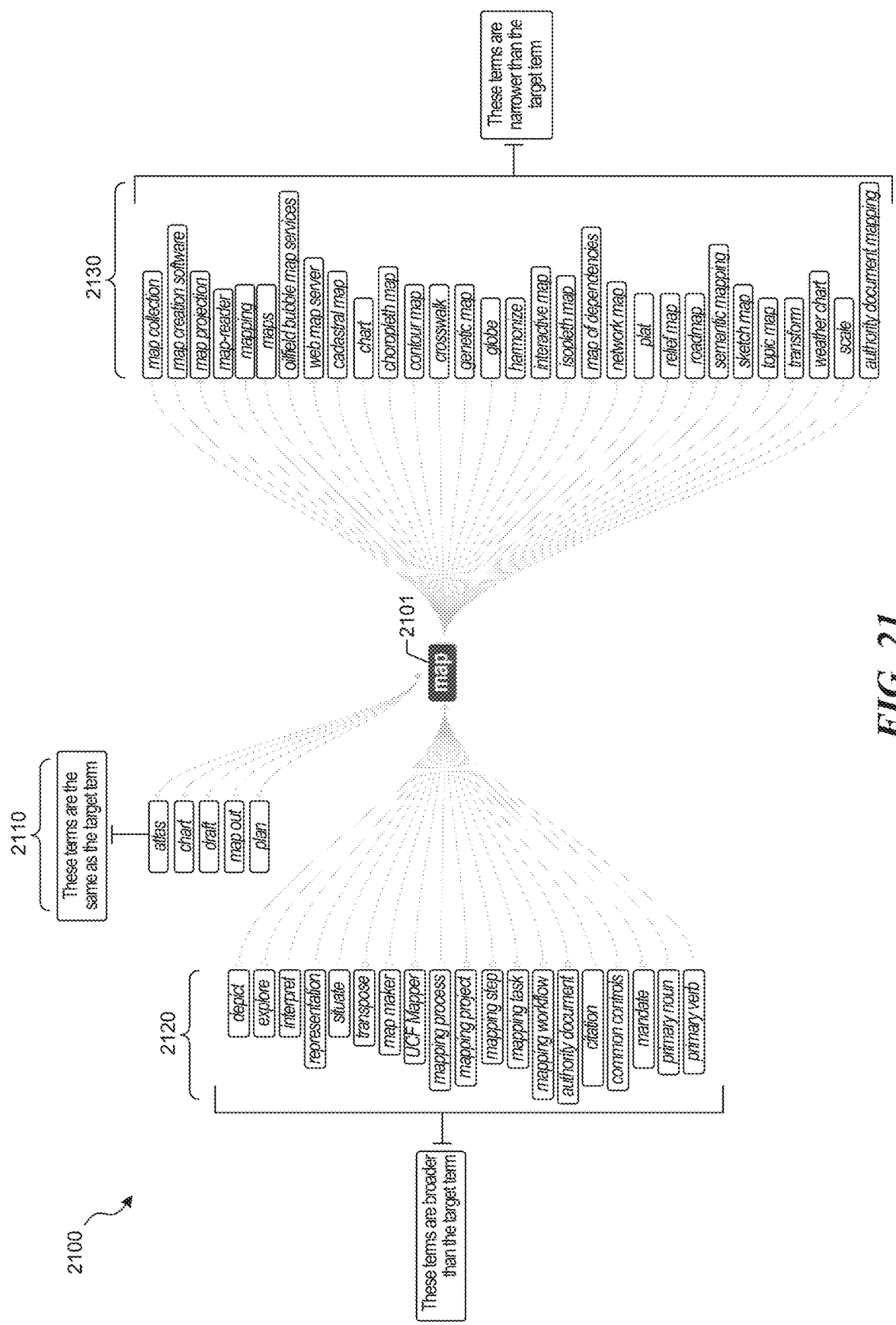
FIG. 21 is a semantic graph diagram showing groups of terms and their definitions that have different kinds of relationships with a subject term.

FIG. 21 is a semantic graph diagram showing groups of terms and their definitions that have different kinds of relationships with a subject term. In the graph 2100, the nodes in group 2110 represent term definitions that are the same as the term definition of subject node 2101. The nodes of group 2120 represent term definitions that are broader than the term definition represented by subject node 2101. And the nodes of group 2130 represent term definitions that are narrower than the term definition represented by subject node 2101.

Figure 22:
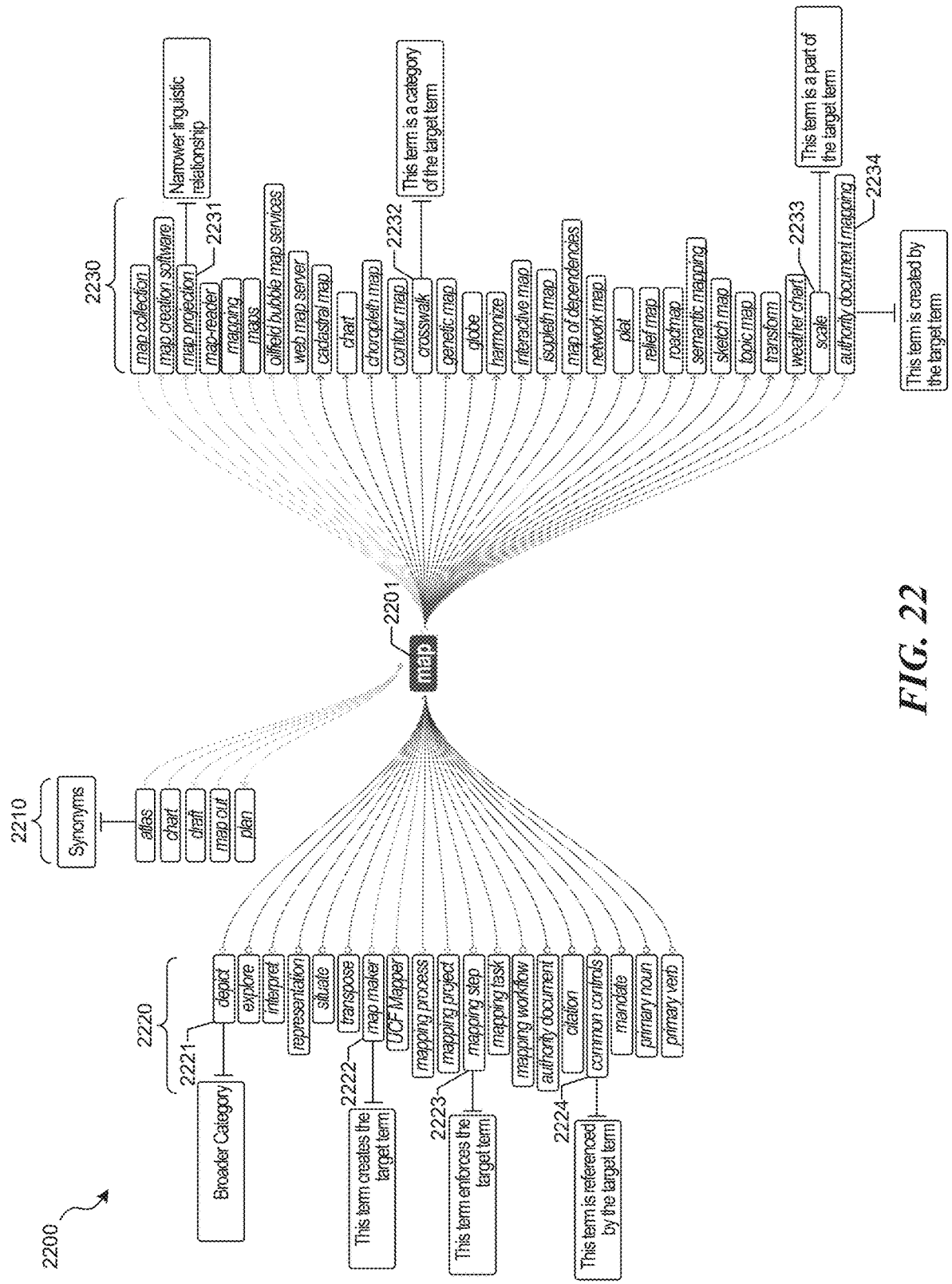
FIG. 22 is a semantic graph diagram showing a variety of other relationships among term definitions.

FIG. 22 is a semantic graph diagram showing a variety of other relationships among term definitions. In particular, the relationships shown in this semantic graph 2200 are based on named entities tagged by the facility. The semantic graph shows the following further types of relationships: the term represented by node 2222 creates the term represented by node 2201; the term represented by node 2223 enforces the term represented by node 2201; the term represented by node 2224 is referenced by the term represented by node 2201; the term represented by node 2232 is a category of the term represented by node 2201; the term represented by node 2233 is a part of the term represented by node 2201; and the term represented by node 2234 is created by the term represented by node 2201.

In various embodiments, the facility performs various related activities as described below.

In some embodiments, the facility generates a substitute authority document from a source authority document. It may do so, for example, where the source authority document is redundant; uses complex language that makes it difficult to read; uses non-standard vocabulary; etc. In some embodiments, the facility constructs a set of controls to represent the mandates of the source authority document as described above, then generates a draft substitute authority document containing the generated controls. The draft substitute authority document can then be revised by human editors, such as to reorder or otherwise rearrange the controls it contains to be mandates of the substitute authority document; to add introductory or explanatory material; to add organization structure and/or formatting; etc. By doing this, the facility addresses the redundancy of the source authority document, by reducing groups of redundant mandates each to single control, and addresses the linguistic complexity or other unreadability of the source authority document by requiring the generated controls that will constitute the mandates of the substitute authority document to satisfy readability standards.

In some embodiments, if the goal is to make the substitute authority document internally consistent, then the facility begins this process with an empty list of controls. In some embodiments, if the goal is to make the substitute authority document consistent with a set of one or more contextual authority documents, the facility begins this process with an empty list of controls; constructs a list of controls from the contextual authority documents; then maps the source authority document using the list of controls constructed from the contextual authority documents. Using this approach, where possible the facility uses language originating from the contextual authority documents in forming the controls that form the mandates in the substitute authority document. This can be useful, for example, where a particular authority document is being written to be consistent with a set of governing regulations.

In some embodiments, the facility evaluates mandates as they are being written, such as in the process of authoring an authority document. The facility determines a readability score for each mandate, such as by combining (a) average sentence length, (b) average number of syllables per word, (c) square root of number of words having more than two syllables, (d) average number of words per sentence, and (e) percentage of words that have more than two syllables. In various embodiments, the facility uses this score to, for example (1) filter mandates to collect those whose score is either greater than or less than some threshold; (2) provide real-time feedback about readability to an author as they are writing mandates; (3) declining to accept mandates whose score is below a particular threshold; (4) automatically adopt mandates whose score is above a threshold; etc. In some embodiments, as a person is editing an authority document, the facility evaluates primary nouns and primary verbs used by the person in mandates, and advises in real time when the person chooses a phrase that is not preferred in its synonym group. For example, when the user types "protect personally identifiable information" as part of a mandate, the facility displays the following notification: "'personally identifiable information' is not the preferred term. Click here to change to the preferred term 'personal data.'" In some embodiments, as the mandates are edited to improve their readability, the facility continues to assess the similarity between the mandates being revised and existing controls in the relevant body of reference data to guard against clarification that comes at the expense of accuracy.

In some embodiments, the facility automatically expands general controls to create a group of more specific controls. For example, where the facility has created a control where the primary verb is "securely configure" and the primary noun is "all types of portable electronic devices", the facility uses "type-of" semantic relationships between this primary noun and other nouns in the semantic graph to create a group of controls that are inferior to the current control in the list of controls, such as those that have "securely configure" as the primary verb, and each of the following as the primary noun: "smartphones", "laptops", and "tablet computers". As a result, when the facility is used to audit compliance by particular organization, it presents audit questions about securely configuring smart phones, laptops, and tablet computers, rather than only the more generic portable electronic devices. In some embodiments, the facility can be configured with a number of generations with which to perform this process. For example, if the facility is configured to perform two generations of this process, it further transforms the more-specific control "securely configure smartphones" to securely configuring iOS smartphones, Android smartphones, and Tizen smartphones. In some embodiments, the facility uses other semantic relationships in this process instead of "type-of", or in addition to "type-of".

In some embodiments, the facility maintains a list of named entities, such as a list of national currencies or a list of corporations, where each element of the list can have multiple expressions. For example, the national currency of Venezuela is variously referred to as "Bolivar", "sovereign bolivar", and "Venezuelan Bolivar". Similarly, a single U.S. airline is referred to by each of the following: "American Airlines", "AmericanAir", "AA", and "AAL". In some embodiments, the facility accesses a set of feeds—such as social media feeds, news feeds, etc.—in which elements of the list are discussed, and uses it to construct a semantic graph-based dictionary. Use of different expressions of the same list item in the same way within the feeds (e.g., "AmericanAir dropped 26 points today", on the same day as "AAL fell 26") causes the dictionary to arrange them in the semantic dictionary in such a way that they are separated by short semantic distance vectors, and thus are synonyms or near-synonyms. When the facility having this semantic dictionary is exposed to an announcement about a particular company, it can transform it to use a version of the list item that is preferred based on usage rates, or based on some other criterion. For example, the facility transforms "AAL announces new routes to Maui" to "American Airlines announces new routes to Maui". In some embodiments, where a particular person is responsible for a particular list item, when the facility receives a piece of news identifying the list item via any of its known expressions, the facility uses the preferred expression of that list item to forward the piece of news to the appropriate person.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for grouping authority document mandates with consistent preferred terms, the method comprising:

identifying multiple mandates from one or more authority documents;

grouping at least two mandates of the multiple mandates according to compliance conditions common to the at least two mandates;

creating a common control representing the group of at least two mandates, wherein each of the at least two mandates is linked to the common control;

updating one or more terms in the common control to preferred terms by:

for a distinguished term occurring in the common control that is used in a distinguished sense, identifying one or more synonym terms, wherein each of the one or more synonym terms and the distinguished term is associated with a number of times that term occurs in a corpus of documents;

selecting a synonym term of the one or more synonym terms that is associated with the largest of the number of times a version of that synonym term occurs in the corpus of documents; and in a new version of the common control, substituting the selected synonym term for the distinguished term; and accessing one or more mandates of the at least two mandates linked to the common control and replacing a subject term, matching the distinguished term in the one or more mandates, with the selected synonym term.

2. The method of claim 1, wherein the number of times a version of the synonym term occurs in the corpus of documents includes occurrences of related terms that share a word root with the version of the synonym term.

3. The method of claim 1 further comprising, for each synonym term, identifying a sense of the synonym term that corresponds to the distinguished sense of the distinguished term, wherein the number of times the synonym term occurs in the corpus of documents includes only occurrences of the synonym term that are used in the same sense as the distinguished term.

4. The method of claim 1, wherein the distinguished term or the subject term is identified in real time as a person edits an authority document.

5. The method of claim 4, wherein substituting the selected synonym term for the distinguished term or the subject term is in response to input from the person responding to a notification that the distinguished term or the subject term is not a preferred term, the input authorizing use of the selected synonym term in place of the distinguished term or the subject term.

6. The method of claim 1, wherein selecting the synonym term further includes determining that a frequency with which the selected synonym term occurs in the corpus of documents is at least a threshold percentage higher than a next largest frequency that another of the one or more synonym terms occurs in the corpus of documents.

7. The method of claim 1, wherein the distinguished term is selected to be replaced in response to the distinguished term being identified as a primary noun or verb in a control.

8. A computing system comprising:

one or more processors; and one or more memories storing instructions that, when executed by the one or more processors, cause the computing system to perform operations comprising:

identifying multiple mandates from one or more authority documents;

grouping at least two mandates of the multiple mandates according to compliance conditions common to the at least two mandates;

creating a common control representing the group of at least two mandates;

linking each of the at least two mandates to the common control;

updating one or more terms in the common control to preferred terms by:

selecting a synonym term, for a distinguished term in the common control, that has been identified as occurring more times in a corpus of documents than the distinguished term and one or more synonym terms other than the selected synonym term;

in a new version of the common control, substituting the selected synonym term for the distinguished term; and accessing one or more mandates of the at least two mandates linked to the common control and replacing a subject term, matching the distinguished term in the one or more mandates, with the selected synonym term.

9. The computing system of claim 8, wherein the identifying the synonym term as occurring more times in the corpus of documents includes counting occurrences of related terms that share a word root with the synonym term.

10. The computing system of claim 8, wherein selecting the synonym term comprises identifying a sense of the synonym term as corresponding to a sense of the distinguished term, and wherein identifying the synonym term as occurring more times in the corpus of documents includes counting only occurrences of the synonym term that are used in the same sense as the distinguished term.

11. The computing system of claim 8, wherein the distinguished term or the subject term is identified in real time as a person edits an authority document.

12. The computing system of claim 11, wherein substituting the selected synonym term for the distinguished term or the subject term includes providing a notification that the distinguished term or the subject term is not a preferred term.

13. The computing system of claim 8, wherein selecting the synonym term further includes determining that a frequency with which the selected synonym term occurs in the corpus of documents is at least a threshold percentage higher than a next largest frequency that another of the one or more synonym terms occurs in the corpus of documents.

14. The computing system of claim 8, wherein the distinguished term is selected to be replaced in response to the distinguished term being identified as a primary noun or primary verb in a control.

15. A non-transitory computer-readable storage medium storing instructions that, when executed by a computing system, cause the computing system to perform operations comprising:

identifying multiple mandates from one or more authority documents;

grouping at least two mandates of the multiple mandates according to compliance conditions common to the at least two mandates;

creating a common control representing the group of at least two mandates;

associating each of the at least two mandates with the common control;

updating one or more terms in the common control to preferred terms by:

selecting a synonym term, for a distinguished term in the common control, that has been identified as occurring more times in a corpus of documents than the distinguished term;

substituting the selected synonym term for the distinguished term in the common control; and accessing one or more mandates of the at least two mandates associated with the common control and replacing a subject term with the selected synonym term.

16. The non-transitory computer-readable storage medium of claim 15, wherein the identifying the synonym term as occurring more times in the corpus of documents includes counting occurrences of related terms that share a word root with the synonym term.

17. The non-transitory computer-readable storage medium of claim 15, wherein selecting the synonym term further comprises identifying a sense of the synonym term as corresponding to a sense of the distinguished term.

18. The non-transitory computer-readable storage medium of claim 15,
wherein the grouping is based on similarity ratings, and
wherein the similarity ratings are computed for a pair of mandates or a pair of a mandate and a common control, based on one or both of:
a number of hops, between particular parts of the pair, identified in a social graph, or
one or more weights applied to one or more edges between the particular parts in the social graph.

19. The non-transitory computer-readable storage medium of claim 15, wherein particular parts include a first primary noun of a first one of the pair and a second primary noun of a second one of the pair.

20. The non-transitory computer-readable storage medium of claim 15, wherein particular parts include a first primary verb of a first one of the pair and a second primary verb of a second one of the pair.

* * * * *